United States Patent [19]

Pross, Jr.

[11] 4,435,757
[45] Mar. 6, 1984

[54] CLOCK CONTROL FOR DIGITAL COMPUTER

[75] Inventor: John W. Pross, Jr., Newfoundland, N.J.

[73] Assignee: The Singer Company, Little Falls, N.J.

[21] Appl. No.: 279,053

[22] Filed: Jun. 30, 1981

Related U.S. Application Data

[63] Continuation of Ser. No. 60,259, Jul. 25, 1979, abandoned.

[51] Int. Cl.³ .............................................. G06F 9/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,656,123 | 4/1972 | Carnevale | 364/200 |
| 3,812,472 | 5/1974 | Mahood | 364/200 |
| 3,919,695 | 11/1975 | Gooding | 364/200 |
| 3,984,812 | 10/1976 | Dahlberg | 364/200 |
| 4,063,308 | 12/1977 | Collins | 364/200 |

Primary Examiner—James D. Thomas
Assistant Examiner—David Y. Eng
Attorney, Agent, or Firm—J. C. Altmiller; T. W. Kennedy

[57] ABSTRACT

A master clock for a microprogrammed digital computer generates output pulses whose separation in time can be varied in response to each microinstruction or to a process-related signal. The output pulses are formed from basic time units from a clock generator which are combined, in digital logic circuitry, to form a minimum time interval and supplemented, under command, with the necessary additional time units to delay the next output pulse by the required amount of time.

1 Claim, 7 Drawing Figures

CLOCK CONTROL FOR DIGITAL COMPUTER

This is a continuation of application Ser. No. 060,259 filed July 25, 1979, now abandoned.

BACKGROUND OF THE INVENTION

1. Field of the Invention

This invention relates to control of a digital computer. More particularly, it relates to means by which a clock controlling a digital computer may be controlled by means of microprogrammed instructions.

2. Discussion of the Prior Art

It is characteristic of a digital computer that it performs its operations one after another or, as it were, in a succession of steps controlled by a program. Ideally speaking, the duration of each step is determined by the time it takes the computer to perform that particular part of the process. When a multitude of processes are being simultaneous performed, the length of the step must be sufficient to accommodate that process which takes the longest time. It follows that different processes take different amounts of time and that differing times are required for the performance of many process steps. Certain digital computers have dynamic means for determining when all processes within a given step have been completed and for control of the advance to the next step. Other types of computers assign the same amount of time to each step, the period of the step being designed into the computer as that time which it takes to perform the longest process the computer might be expected to encounter. The best computer performance is achieved in the first kind of computer, but at the cost of considerable circuit complexity. In the case of a computer using the synchronous system, simplicity of design is achieved at the cost of reduced performance. Control of each step in the second kind of computer is usually initiated by a master clock.

SUMMARY OF THE INVENTION

It is a purpose of this invention to provide a master clock for a microprogrammed digital computer which provides output pulses whose separation in time can be adjusted, by each microinstruction or by external process-related signals, to the least amount of time needed to complete the process initiated by the microinstruction. In this way a complex dynamic determination of completion of the process is avoided while still achieving the best possible time performance.

The problem set forth above has two aspects. Certain operations of the computer require the same amount of time for performance each time they are done; other operations require a variable amount of time. An example of the first kind might be the addition of two numbers together. An example of the second kind would be the addition of two numbers and then, if the sum is positive, going to a first location in a memory located in the central processing unit for the next instruction, but, if the sum is negative, going to a second location in the memory for the next instruction. If, for example, the process of adding requires 240 nanoseconds and the process of determining the sign of the sum requires 50 nanoseconds, a total time of 290 nanoseconds would be required. However, there will be many occasions when it is not necessary to determine the sign of the result in order to determine the location of the next instruction, and setting aside 50 nanoseconds each time would be wasteful of computer time. According to one aspect of the invention, this waste of time is avoided by causing the microinstruction which calls for performance of a particular process to appropriately adjust the clock period. Thus, where the addition requires 240 nanoseconds, an instruction would be given to the clock at the same time the process is initiated, calling for it to generate its next pulse after, say, 250 nanoseconds. Then, if different memory locations are needed, depending upon whether the sum is positive or negative, the microinstruction initiating the process might call for a delay of 300 nanoseconds between clock pulses.

In the case of processes requiring an unpredictable amount of time for completion, such as recovery of a word in a memory which is located outside the central processor of the digital computer, the time for completion of the process can vary as a function of the type of memory being accessed or as a function of location of an item in the memory. Thus, memories having different speeds may be attached to the computer or a particular memory may be used which performs in varying times. Another feature of the invention, then, delays the output of the master clock under control of signals from such devices to provide a variable clock pulse interval related to the speed of the particular memory or other device being accessed.

These objects and others, which will become clear upon reading the below-appended description, are met in the invention by providing a clock oscillator, such as a square wave generator, whose alternations establish a basic unit of time for the master clock. By means of digital logic circuitry, a fixed number of these time units is combined and established as the minimum time interval of the master clock. Additional increments may be added in response to signals in the form of a bit, or bits, which form a part of the stored microinstruction for the particular process step to be performed in the arithmetic logic unit of the central processor. The master clock is also subject to control by at least two other signals generated by a separate memory, or the like, one signal indicating when the memory is ready to be read, and another, when the data from the memory is available.

DETAILED DESCRIPTION OF THE DRAWINGS

DETAILED DESCRIPTION OF THE INVENTION

Figure 1:
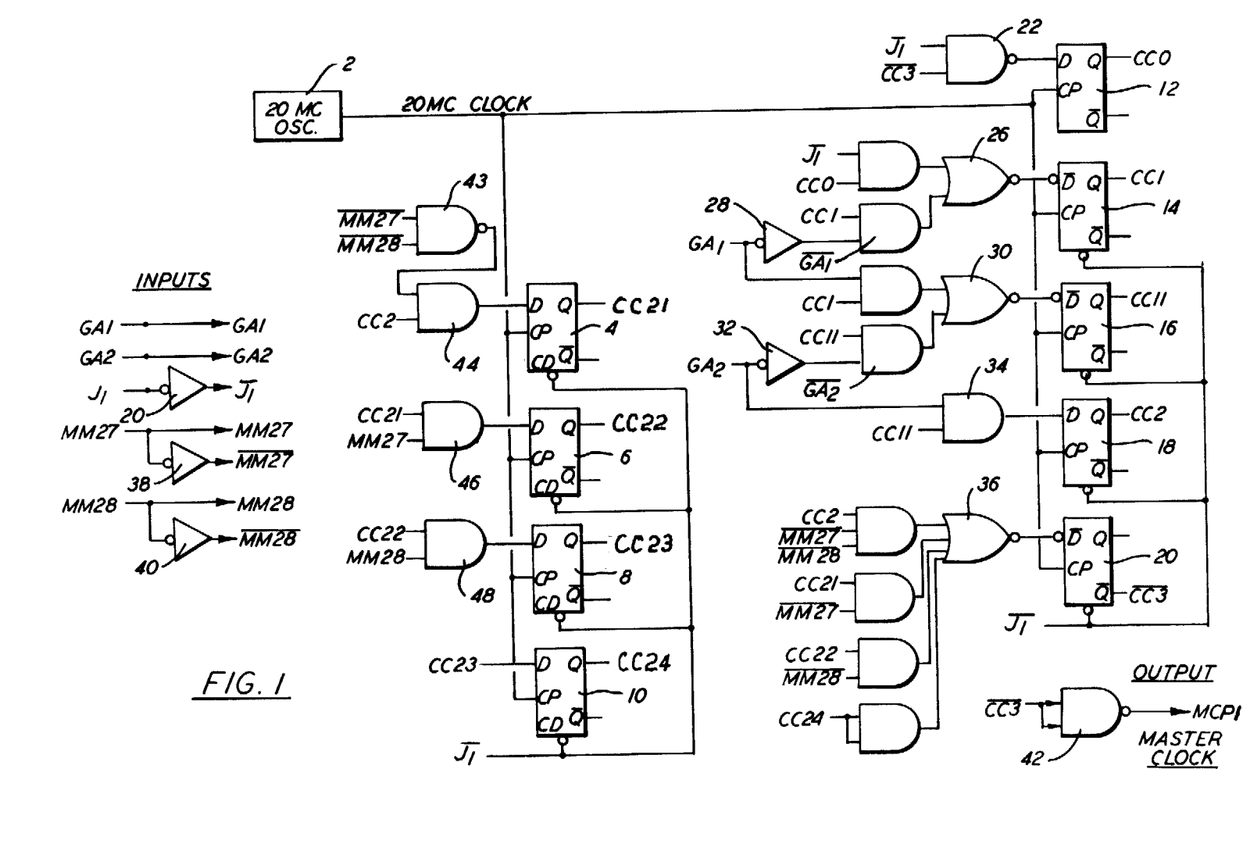
FIG. 1 is a schematic drawing of a master clock for a computer embodying the teachings of the invention.
Figure 2:
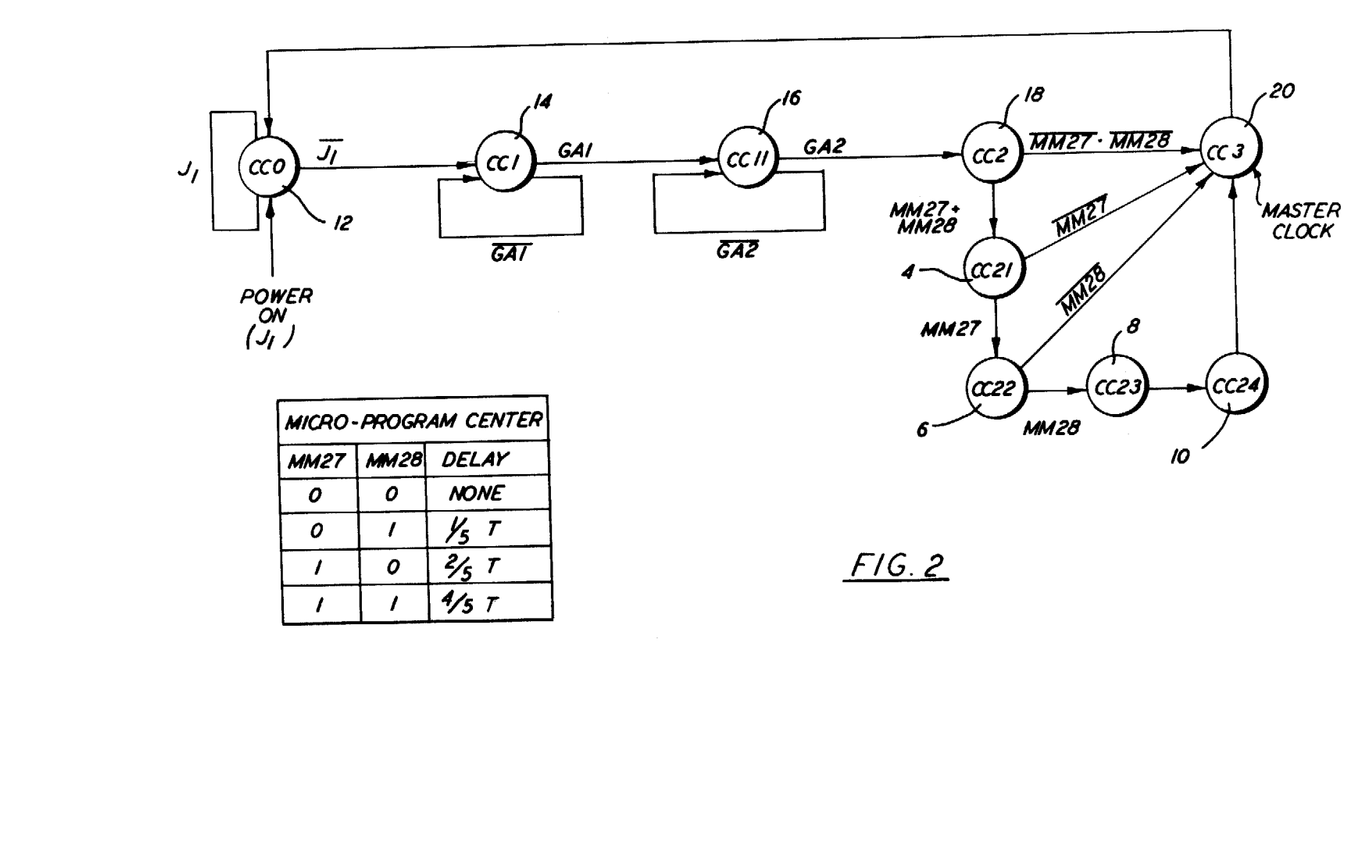
FIG. 2 is a state diagram of the microprogram clock control illustrated in FIG. 1.

Reference is first made to FIGS. 1 and 2 in which FIG. 1 is a schematic diagram of a master clock having a variable time output in accordance with the teachings of the invention. For the purpose of simplicity, the diagram has been simplified by eliminating the interconnecting wiring between the various circuit elements; the interconnections are instead indicated by the letters and numbers associated with the various terminals on the devices. It will be understood that all terminals having the same designation are ordinarily wired together.

In FIG. 1, the master clock has five input lines which are shown at the left of the drawing. The single output line is shown in the lower right hand corner of the drawing. The central portion of the drawing shows a logic circuit connected to an oscillator 2 which, for the purposes of illustration, generates a square wave having a basic frequency of 20 megacycles and a duty cycle of approximately 50%. The frequency of the oscillator is fixed and, while long term stability is not of critical importance, it will be understood by those skilled in the art that it is desirable for good definition to use an oscillator whose stability is 1% or better. The period of the oscillator determines the size of the increment by which the period of the master clock may be changed. In general, the smaller the period, the finer is the control. As will be evident, more complex circuitry must be provided to cover the same total range of time period in a master clock which uses smaller increments. In the present, illustrative embodiment, a 50 nanosecond increment is used, five increments being combined to form the basic master clock period. For an arithmetic logic unit using a conventional TTL structure, the 250 nanosecond spacing provides a choice of four time values for extending the length of the pulse. As will be seen, only two microinstruction bits need be provided in programming the extended period. If the frequency chosen were 25 megacycles instead of 20, then a 40 nonosecond increment would be provided, but it would be necessary, in order to obtain the same range of 200 additional nanseconds, to make five choices, requiring another microprogram bit along with additional circuitry.

The output of the 20 megacycle clock is fed to the clock pulse inputs of each of nine delay flip-flops 4, 6, 8, 10, 12, 14, 16, 18, and 20.

The input circuits at the left of the drawing show the five inputs which control the operation of the master clock circuitry. Two of the inputs, on connecting lines labelled MM27 and MM28, transmit signals from the microinstruction register of the computers central processor. For this illustrative embodiment, it has been assumed that a two-bit field is available in the central processor microinstruction for control of the master clock.

Two other inputs, GA1 and GA2, provide for additional control of the clock circuitry. These signals, in the illustrative embodiment, are timing signals from a memory (see FIG. 7) which requires an upredictable amount of time to perform its function. Thus, a pulse received on input line GA1 signals that the memory is ready to be read and is used to interrupt the clock circuit and a pulse received on GA2 indicates when the data from the memory is available and reinitiates generation of the clock pulse. One additional input signal, J1, is provided to set up the logic circuitry when the power is turned on.

The output circuit of the master clock is shown in the lower right hand corner of FIG. 1; it consists of a single line for communicating clock pulses to those parts of the central processor which are subject to control by the master clock.

Thus, it is considered that each state of the circuitry is defined by an individual flip-flop, and as can be seen in the figure, there are nine flip-flops numbered 4, 6, 8, 10, 12, 14, 16, 18 and 20. Reference to the state diagram of FIG. 2 shows that there are nine corresponding states, transition from state to state being under control of clock oscillator 2.

At start up, J1 is assumed to be in the high, or "on" state. Start up input signal $\overline{J1}$ is applied to inverter 20, the output of which is the inverse, or "not" signal, J1. The $\overline{J1}$ signal from inverter 20 is fed to one input of NAND gate 22, to one input of Dual AND-OR Invert gate 26, and to the clear terminals of all the flip-flips except flip-flop 12. As a result of J1 being high, all the flip-flops, with the exception of flip-flop 12, are forced low; flip-flop 12 is set high. This condition prevails until J1 goes low after the power has stabilized at its final value and the 20 mc oscillator has begun functioning. The initial $\overline{J1}$ signal sent through NAND gate 22 is inverted there, such that a high signal is fed to the D input of flip-flop 12; then the rise of the first clock pulse of the 20 mc clock will cause output CCO of flip-flop 12 to turn on and to remain on for each succeeding 20 mc clock pulse until $\overline{J1}$ goes high (J1 goes low). In FIG. 2, this action is illustrated by the J1 loop attached to the circle which symbolically represents flip-flop 12 of FIG. 1. There the power-on signal J1 is fed in, along with pulses from clock oscillator 2 and the output of flip-flop 12 is the $\overline{J1}$ signal fed to flip-flop, 14.

Once power has been applied, there are five modes of operation of the circuit of FIG. 1. Four modes are under control of microinstruction bits received as input signals MM27 and MM28; one of the modes is under control of the input signals GA1 and GA2. The last named mode is intended for the situation when the central processing unit is accessing data external to itself, and will be discussed later. When lines GA1 and GA2 are both high (in a "1") condition, operation in the fifth mode is not involved.

Referring to FIG. 2, it will be seen that the state of the circuitry progresses from flip-flop 12 through flip-flops 14 and 16 to flip-flops 18, 4, 6, 8, 10, and 20 and will continue in this fashion so long as the inputs remain in the condition given above. This action can be traced in FIG. 1: when $\overline{J1}$ goes high, the outputs of gates 22 and 26 go low. At the occurrence of the next 20 mc clock pulse, which, for this discussion is called clock 1, flip-flop 12 is turned off and flip-flop 14 is simultaneously turned on, the output of gate 26 being connected to the $\overline{D}$ input of flip-flop 14. At clock 2, the next 20 mc clock pulse, flip-flop 14 will be turned off, since gate 26 will be high as a result of CCO, the input signal to gate 26 from flip-flop 12, being low, and $\overline{GA1}$, which is fed from inverter 28 to another input of gate 26, also being low. (It will be remembered that GA1 was assumed to be high). The turning off of flip-flop 14 has, simultaneously, turned on flip-flop 16, since gate 30, which is connected to the $\overline{D}$ input of flip-flop 16, is low. The input to the $\overline{D}$ connection of flip-flop 16 is low because flip-flop 14 is on and, therefore, circuit CC1 is high. Meanwhile GA1 remains high, so that, at the occurrence of clock 2, both inputs to gate 30 are high. At the occurrence of the next 20 megacycle clock pulse, clock 3, flip-flop 16 will be turned off because gate 30 will have become high as a result of both flip-flop 14 and the CC1 input being low, and because $\overline{GA2}$, the output of inverter 32, which is also an input to gate 30, is also low. Simultaneously with flip-flop 16 being turned off and its output CC11 going low, flip-flop 18 is turned on as a result of the output of gate 34, connected to the D input of flip-flop 18, being high. The D input of flip-flop 18 is high because both the output CC11 of flip-flop 16 and GA2 are high when clock pulse 3 of the 20 mc clock arrives, and these are both inputs to gate 34.

At the occurrence of clock 4, the signal on output CC2 of flip-flop 18 goes low because flip-flop 16 is now low, causing gate 34 to be low. At the time flip-flop 18 is being turned off, flip-flop 20 is turned on because the output of gate 36, connected to the D input of gate 20, is low. The output of gate 36 is low because the three signals CC2, $\overline{MM27}$ and $\overline{MM28}$, all of which are inputs to gate 36, are high at the time of clock pulse 4. MM27 and MM28, it will be noted, are output signals from inverters 38 and 40 which are connected to the input lines carrying signals $\overline{MM27}$ and $\overline{MM28}$, respectively. Because the inputs on these lines were assumed to be low at the beginning of this description, signals $\overline{MM27}$ and $\overline{MM28}$ are high. Finally, at the time of clock 5, flip-flop 20 is turned off because input signal CC2 from flip-flop 18, fed to gate 36, is low. At the same time that flip-flop 20 is being turned off, flip-flop 12 is turned on again, the high condition of gate 22 being brought about by $\overline{CC3}$, the output of flip-flop 20, being low.

Figure 3:
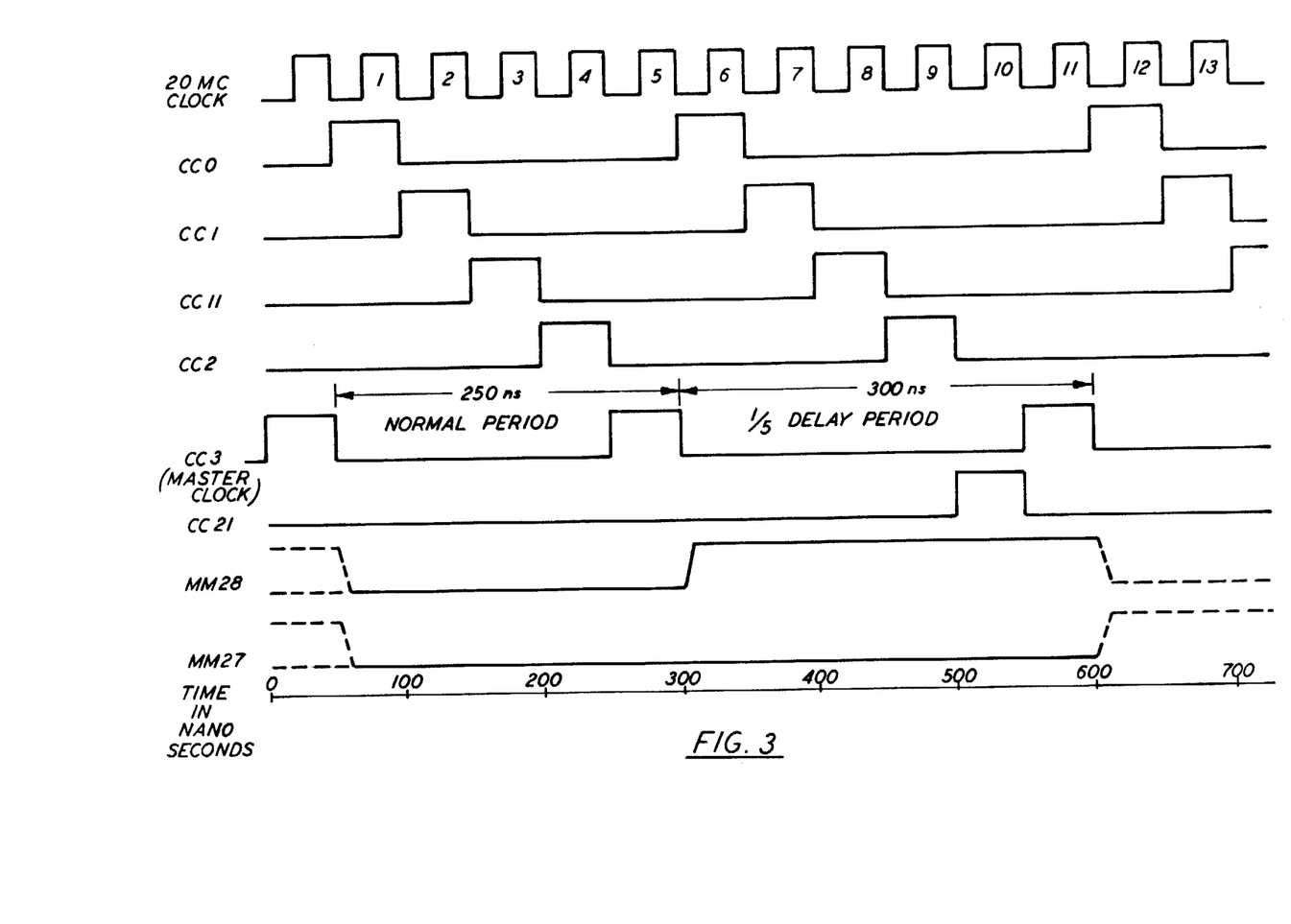
FIGS. 3, 4, and 5 are timing diagrams showing generation of clock pulses at normal intervals and with incremental added delays.

This sequence of events can be followed in FIG. 3, clock pulse by clock pulse. The top line of FIG. 3 shows the 20 megacycle clock pulses, appropriately numbered. Underneath the clock pulses, on succeeding lines, are the output signals generated by flip-flops 12, 14, 16, 18, and 20, and transmitted on output lines CC0, CC1, CC11, CC2 and CC3. It will be seen that, as long as the input conditions on transmission lines GA1, GA2, MM27 and MM28 remain in the condition specified, the above activity repeats itself every 250 nanoseconds. The actual output pulse of the master clock shown on line MCP1, is produced by means of gate 42, both inputs of which are connected to the CC3 signal output of flip-flop 20. The circuitry in this mode has produced a master clock having a pulse width of 50 nanoseconds and a period of 250 nanoseconds.

Since the output MCP1 is intended for use as the master clock of a central processing unit, it is assumed that the inputs to the circuitry change only on the fall of MCP1. Thus, there will not be a change in the mode selected by MM27 and MM28, except at the very beginning of the cycle, i.e., during the existence of the positive signal CC0. This being the case, if, at the fall of MCP1, the signal MM28 goes high (as shown in FIG. 3 at time: 300 nanoseconds) while GA1 and GA2 remain high and MM27 remains low, the signal flow process is the same as before except that, instead of passing directly from flip-flop 18 to flip-flop 20, a diversion takes place and the signal flow passes from flip-flop 18 to flip-flop 4 and then to flip-flop 20. This has the effect of lengthening time between the master clock pulses from 250 ns. to 300 ns. This is brought about in the circuit of FIG. 1 as a consequence of the signal $\overline{MM28}$ signal being low instead of high, as in the previous mode. This causes gate 36 to be high at the same time as flip-flop 18. Because gate 36 is high, flip-flop 20 is prevented from being turned on at the time of the clock pulse which turns off flip-flop 18. However, the input CC2 and the output signal of gate 43 are high, causing the output of gate 44, connected to the D input of flip-flop 4, to be high. The output of gate 43 is high because one of its inputs, $\overline{MM28}$, is low. The period of time for which flip-flop 4 will remain on is only one period of the 20 mc clock, because, at the occurrence of the next pulse from the 20 mc clock, flip-flop 18 will be low, in turn driving gate 44, connected to the D input of flip-flop 4, low. At the same time, flip-flop 20 will be turned on, because gate 36 is driven low by input CC21 from flip-flop 4 and by $\overline{MM27}$, both of which are high. Turning on flip-flop 20 activates output gate 42, as before.

The effect of the above sequence of events may be seen in the right half of FIG. 3. There, the 20 mc clock pulses 6, 7, 8 and 9 initiate the same activity as occurred in the left half of FIG. 3 at clock pulses 1, 2, 3 and 4. At clock pulse 10, however, the generation of signal CC21 has triggered flip-flop 20 at a time which is delayed 50 ns., giving a total of 300 ns. for the master pulse clock interval.

Figure 4:
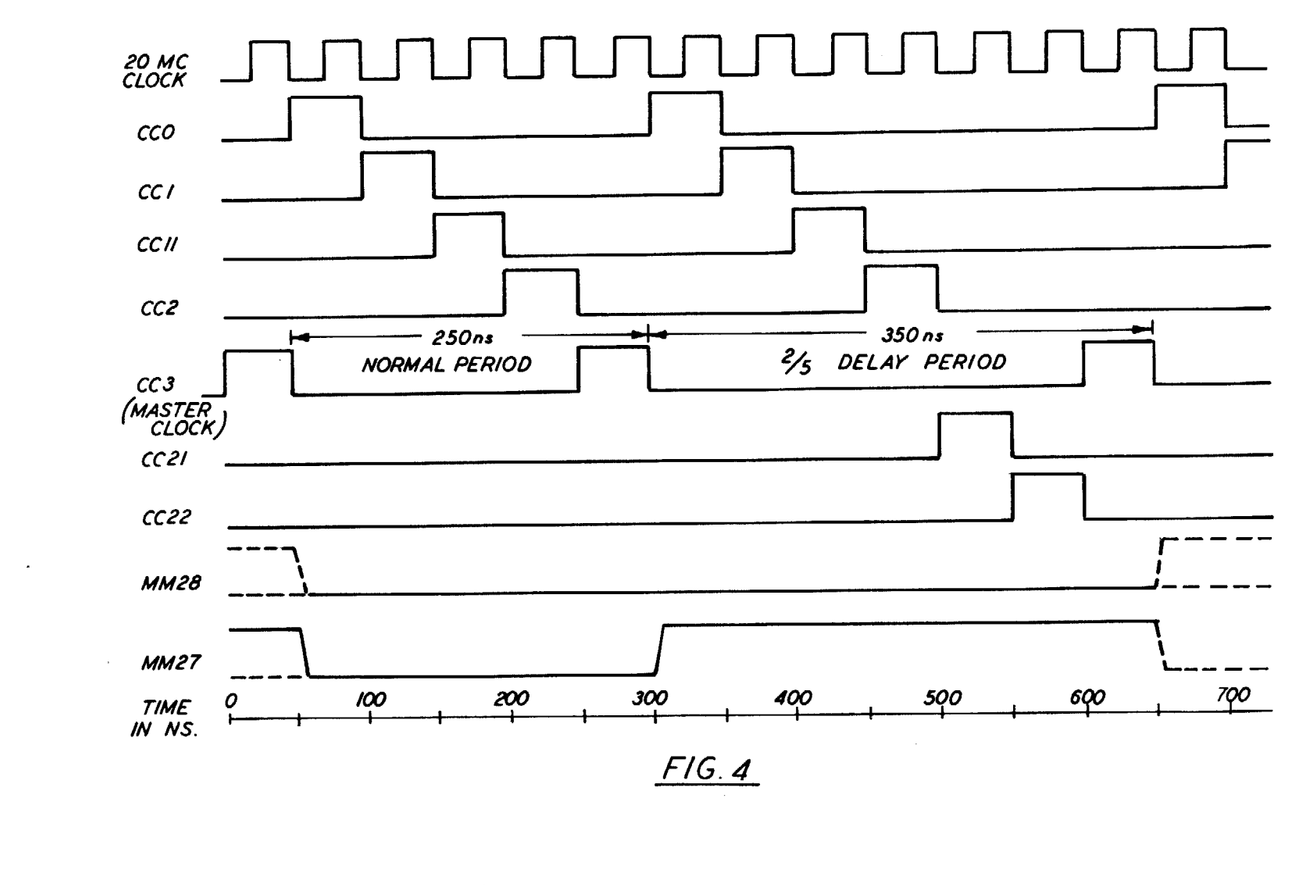

In the next case, as shown in FIG. 4, the signal MM27 goes high at the occurrence of a 20 mc. pulse, at time=300 nanoseconds, instead of MM28, as in the previous example. From the state diagram of FIG. 2, it will be seen that diversion takes place after flip-flop 18 and continues, through flip-flop 4, flip-flop 6, and flip-flop 20, to flip-flop 12. This activity can be traced in FIG. 1 by noting that flip-flop 20 cannot come on when flip-flop 18 is on nor when flip-flop 4 is on, because the signal $\overline{MM27}$ is "anded" with each of these signals at the input to gate 36. However, flip-flop 20 can turn on when flip-flop 16 is high because its output CC22 is "anded" with $\overline{MM28}$, which is high, at the input to gate 36. Flip-flop 6 will come on, at the beginning of the 20 mc. clock period succeeding the one in which flip-flop 4 is on, for it is at that time that the D input of flip-flop 6 is high. The D input of flip-flop 6 is connected to gate 46 whose two inputs CC21 and MM27 are high.

Figure 5:
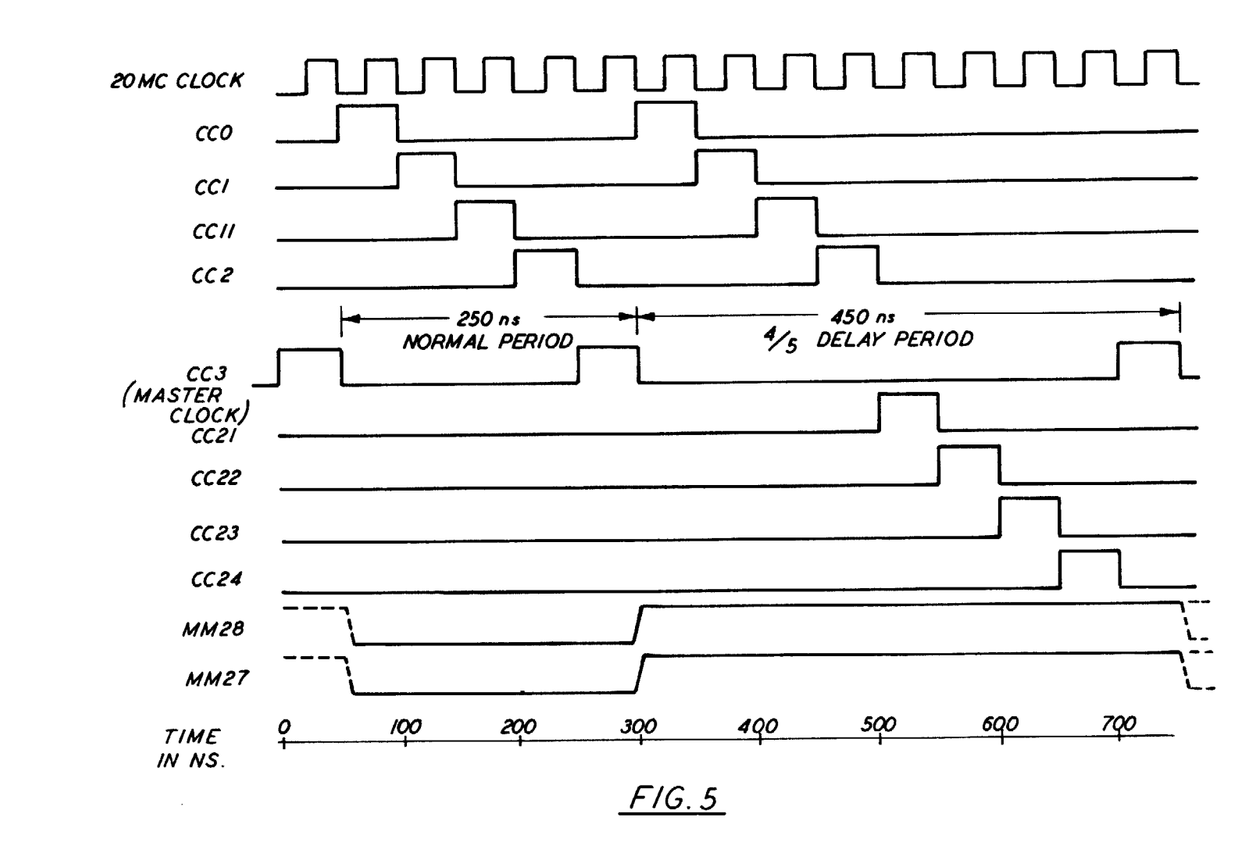

The case where both MM27 and MM28 are high at the same time is shown in FIG. 5. Tracing this mode in FIG. 2, the same pattern of action is seen, with the state of the circuitry now proceeding from flip-flop 18 to flip-flop 4, to flip-flop 6, to flip-flop 8, to flip-flop 10 and, finally, to flip-flop 20. Thus a master clock pulse delayed by a period of 450 nanoseconds is generated by the use of flip-flop 10. From FIG. 1, it will be seen that gate 36 remains high throughout the whole period until flip-flop 10 turns on, because all the "and" gates which make up the inputs to gate 36, other than the one receiving signal CC24, have as input signals, either $\overline{MM28}$ or $\overline{MM27}$, or both, and both of these are low. Thus, flip-flop 20 will not be turned on until flip-flop 10 turns on. Flip-flop 10 will not turn on until flip-flop 8 is on, because the signal CC23 from flip-flop 8 is applied to the D input of flip-flop 10 and flip-flop 8 does not come on until after flip-flop 6, since the D input of flip-flop 28 is connected to gate 48 which has, as its inputs, signals CC22 and MM28.

The fifth and last mode of operation provided for in the circuitry of FIG. 1 produces a time delay which can be related to a time required for completion of process outside of the central processing unit. For the sake of illustration, it is assumed that the central processor is to read a word from storage in a separate memory and that this process involves addressing the memory, after which an unpredictably varying amount of time is required before the desired word stored in the memory is available for use. The circuitry provided by the present invention enables suspension of processing steps in the central processing unit until the word is available to be read. As can be seen in the state diagram, FIG. 2, operation of the circuitry stops at flip-flop 14 when input signal GA1 goes low. Signal GA1 remains low until the addressed device has received the address. When the addrress is received, signal GA1 goes high and is passed to flip-flop 16 where the signal flow stops as a result of input signal GA2 going low. This signal is also controlled by the addrressed device and is low until the addressed data has been obtained and placed on line. When the data is placed on line, GA2 goes high, and signal flow proceeds through flip-flop 18 to flip-flop 20, where, if signals MM27 and MM28 are low, the master clock output pulse is immediately produced. The result is complete stretching or adaptation of the master clock output pulse timing to the completion of the memory reading operation. Note, also, that should the microprogrammed function of the processor require extra time, that time may be signalled to the master clock, as before, and added to the stretched time just generated.

Figure 6:
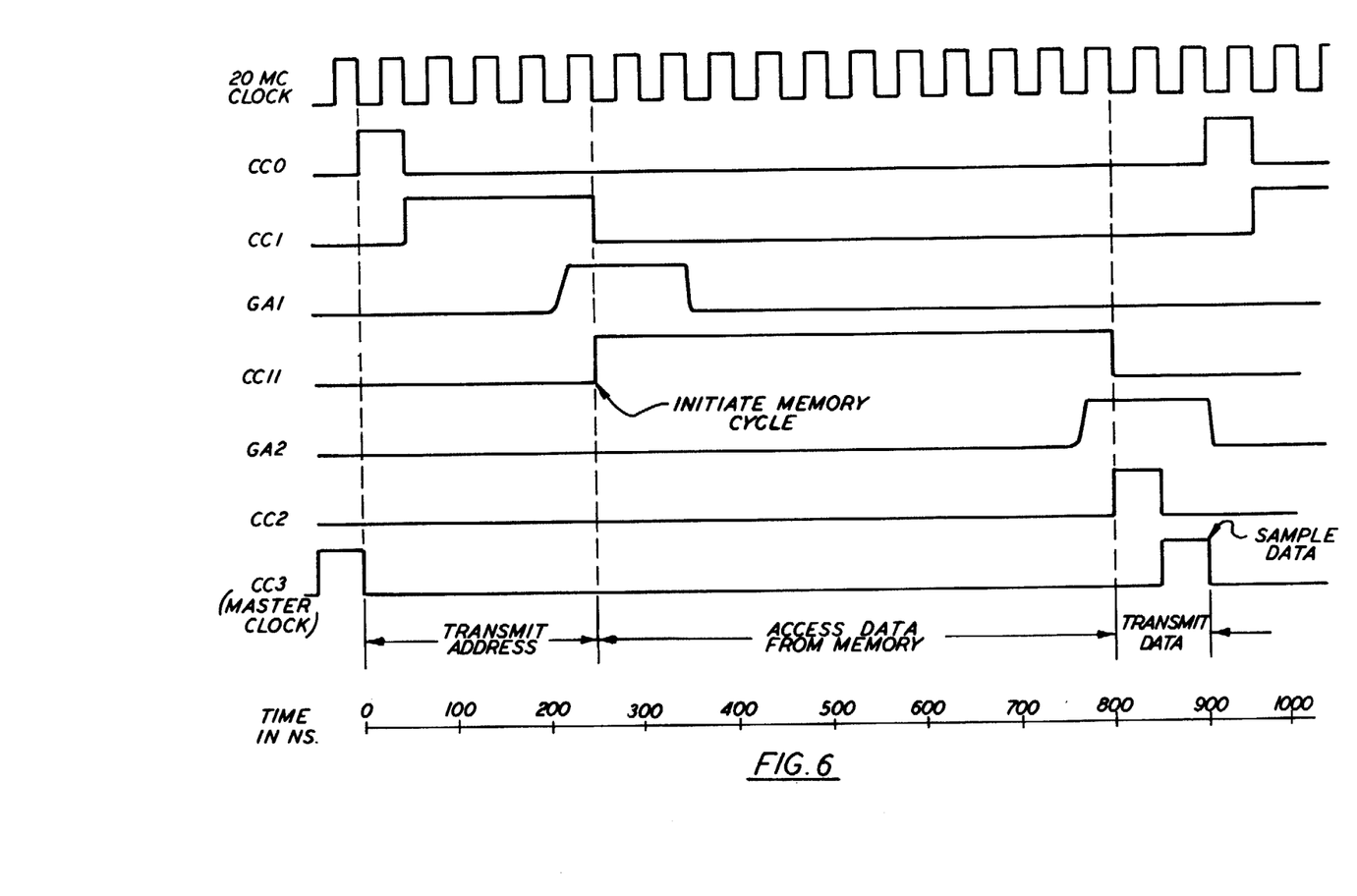
FIG. 6 shows delay of clock pulse generation until an outside process is completed.

It will be clear to those skilled in the art that, not only is the variable delay thus provided adaptable from one memory device to another, but also that it may be applied to other sorts of structures with the result depicted in the timing diagram of FIG. 6. In this illustrative case, 250 ns. were spent transmitting the address, 550 ns. were spent obtaining the data, and a final 100 ns. were spent transmitting the data to central processor, for it has been assumed that the central processor will not sample the data until the master clock pulse occurs.

In summary, the first four modes of operation of the circuitry provided in this illustrative embodiment of the invention have provided for the generation of a master clock pulse whose period is variable, being subject to instruction included in a microconstruction controlling the central processor of the computer. In the illustrative example, this period is adjustable in increments of 50 nanoseconds from 250 nanoseconds to 450 nanoseconds, the 400 nanosecond interval having been intentionally omitted. This circuit is capable of a wide variety of variations in actual use, including changed length of minimum increment as well as numbers of differeing incremental steps. It will be apparent to those skilled in the art that the teachings of the invention may be adapted to the particular circumstances, process step lengths and numbers encountered in particular computers. The fifth mode provides for an indefinite prolongation of the master clock period subject to control external of the arithmetic logic unit in the central processor.

The circuit of the illustrative embodiment of FIG. 1 can readily be realized using standard commercial components. Thus, flip-flops 4, 6, 8, 10, 12, 14, 16, 18 and 20 each may be a Dual D-Type Positive Edge Triggered Flip-Flop with Preset and Clear of the type designated 54S74, for example. Gates 22 and 43 may be Quad 2-Input NAND Gates, type 54S00. Gates 34, 44, 46 and 48 are Quad 2-Input AND Gates, type 54S08. Gates 26 and 30 can be Dual 2-Wide 2-Input AND-OR-Invert Gates, of the type known as 54S51. Gate 36 is a 4-2-3-2-Input AND-OR-Invert Gate, type 54S64. Gate 42 is a Quad 2-Input NAND Buffer and may be of the type known as 54S37. Inverters 20, 38 and 40 are Hex inverters and may be of the type known as 54S04. These units, being of TTL construction, are appropriate for use with an array of registers and arithmetic elements such are used in the processors of many computers and are appropriate for the frequency of operation. For a slower frequency of operation, some other type of digital circuitry could be used. For example, at one megacycle, CMOS or even DTL circuitry might be chosen, and, similarly, for higher frequencies, such as at 100 MC, ECL circuitry might be used. In any case, the principles are the same.

Figure 7:
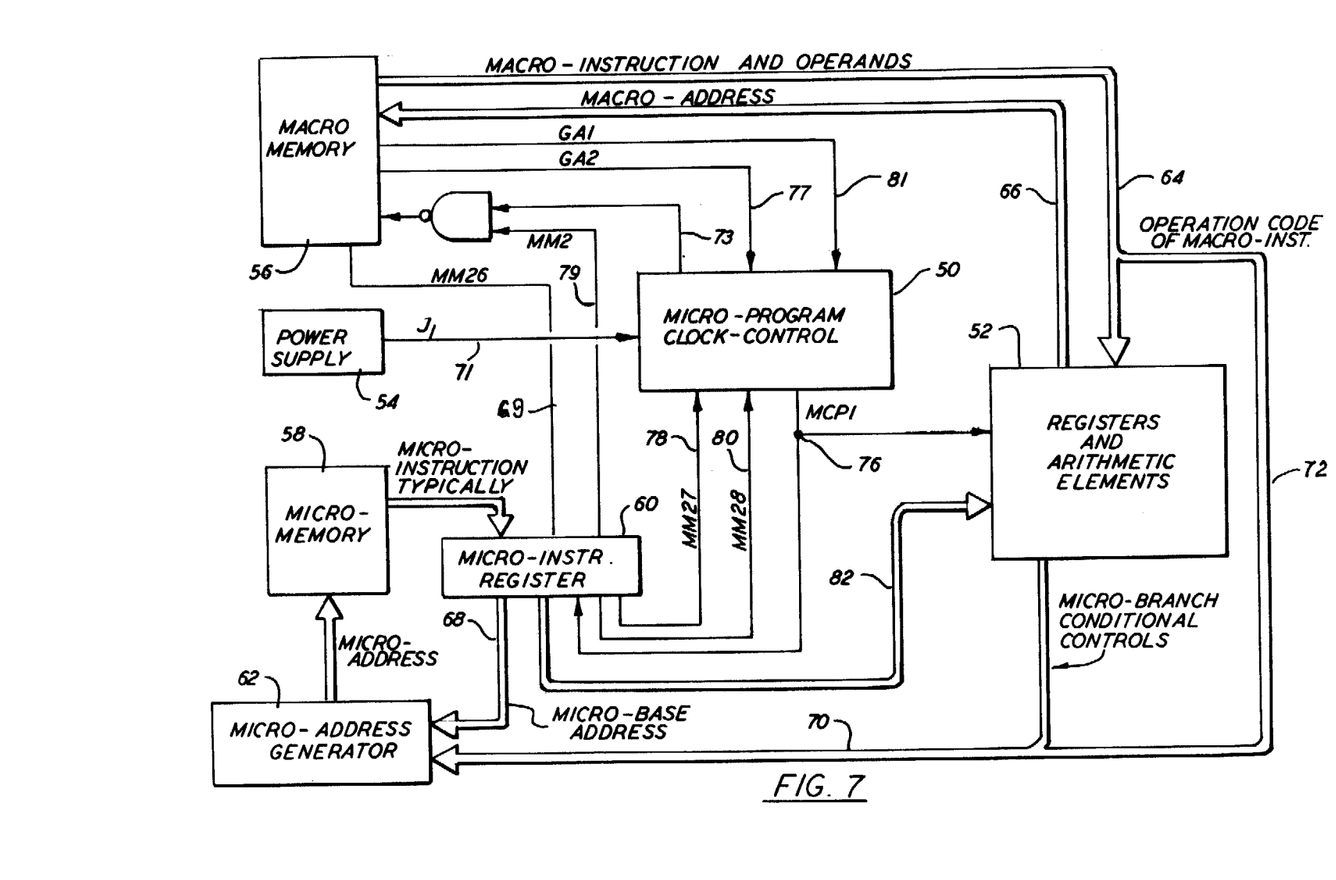
FIG. 7 is a block diagram of a computer controlled by a master clock in accordance with the invention.

Reference is now made to FIG. 7 which shows a microprogram clock control 50, of the type described above, as it may be used in a computer having a processing unit 52, a power supply 54, a main, or "macro", memory 56, a micromemory 58, a microinstruction register 60, and a microaddress generator 62. These units are interconnected as shown in the drawing in which the wide lines denote busses, or parallel paths, for parallel information transfer and the narrow lines indicate single line information transfer connections.

Central processor 52 contains registers and arithmetic elements for performing various conventional functions by which information stored in macromemory 56 is processed, one step at a time, under the control of a program, which, in this illustrative embodiment, is also stored in macromemory 56.

Power supply 54 is connected to master clock 50 by connecting line 71 which transmits the signal J1 for lining up the components of master clock 50 when the power is turned on, as described above. The remainder of the power supply circuitry is omitted in the interest of brevity, as will be understood by those skilled in the art.

Separate memory 56 is connected to master clock 50 via connecting line 73 and AND gate 75. Line 79 from microinstruction register 60 is also connected to gate 75 so that when lines 73 and 79 both go high, a start pulse is transmitted to macromemory 56. This assures that a start signal from microinstruction register 60 does not initiate use of memory 56 to store data or to act on an address instruction transmitted on line 66 from processor 52. A "go ahead" signal GA2 received by master clock 50 on line 77 from separate memory 56 indicates that the memory is ready to be read; a like signal, GA1, on line 81 indicates that accession of the memory has begun. Whether macromemory 56 writes or reads is determined by a signal transmitted on line 69 from microinstruction register 60.

Addresses for micromemory 58 are generated by microaddress generator 62 in response to signals simultaneously received on 10-bit microbase address line 68, and on line 70 which transmits 24-bit microbranch conditional control signals from processor 52 as well as 6-bit operation code signals derived directly from memory 56 via lines 64 and 72. The output of micromemory 58, typically 64 bits, is supplied to microinstruction register 60 via connecting line 74 and held there until called for by a master clock pulse received on line 76 from master clock 50. Connecting lines 78 and 80 transmit the microprogram clock control signals MM27 and MM28 to master clock 50 and connecting line 82 transfers the balance of the instruction (50 bits) remaining in register 60 to processing unit 52.

Micromemory 58 may be hard wired or may be programmable, as will be understood by those skilled in the art. In addition to bits for controlling the generation of clock pulses and the performance of arithmetic and logic functions in the processor, it may typically contain bits for controlling other functions of the processor.

Using the example given above, a typical function of the processing unit might be addition of the contents of 2 registers, followed by determination of whether or not the output is zero. This is accomplished by means of an instruction delivered from micromemory 58, via micro instruction register 60, to processing unit 52. Upon receipt of a master clock pulse by microinstruction register 60, which results in connection of corresponding individual storage elements of two registers in processor 52, which already contain the numbers to be added, to an adder in which the signals are added and a sum produced. For the sake of this discussion, it will be assumed that this step takes about 250 nanoseconds and includes enough time for the voltages in the individual units to settle down. This sum is now available for immediate further processing, and which of the next processing options is used depends upon whether the sum is zero. For this purpose, the microinstruction has also resulted in connection of a zero detector to the adder, which requires, say, another 20 nanoseconds or so before it settles down. Once it has settled down, the signal information it generates as to whether or not a zero was present in the adder is available for deciding the next processing step. Other, different process steps may take longer times.

As was stated above, the varying lengths of process time have been accommodated in prior art computers either by complex circuitry for determining when the process had actually become complete or by the use of regularly occurring clock pulses sufficiently spaced apart to permit completion of the longest possible process step. The use of the microprogram clock control of the invention permits standardizing the interval between clock pulses at a short length which coincides with the minimum time for a completion of a process step, while also accomodating longer processes when they occur. Thus, macroinstructions and operands stored, for example as thirty-two bit "words" in separate macromemory 56, are called up, in turn, by a macroaddress from processing unit 52. This new information is transferred, in parallel, on connecting line 64 to processing unit 52, six of the bits being sent directly to microaddress generator 62. In microaddress generator 62 the six bits are converted into 10 bit microaddresses and communicated to micromemory 58 where a microinstruction, which may typically be of 64 bit size, is read out and transmitted to microinstruction register 60. The operation code, micro-address generator 62, and micromemory 58 are permanent parts of the structure of the computer; that is, a large number of operations involving a sequence of process steps in the processing unit are permanently programmed in the micromemory and may be chosen and applied by means of the operation code upon command of the macromemory. Of the 64 bits transferred to microinstruction register 60, ten are referred back to microaddress generator 62 as a micro base address, two are transmitted to master clock 50, via lines MM27 and MM28, and the remaining 52 bits are transmitted to processing unit 52 for effecting the necessary interconnections between registers and arithmetic elements and performing the specified process step. To accommodate the needed additional twenty nanoseconds required for zero detection in the given example, micromemory 58 would transfer, as part of its typical microinstruction, a positive signal to that element in microinstruction register 60 which is connected to input line 80, (MM28) of master clock 50. Then, at the time the next master clock pulse is generated by master clock 50 and transferred by the line 76 (MCP1) to microinstruction register 60 and to processing unit 52, the microinstruction stored in register 60 would be released, and line 80 (MM28) would go high, preparing master clock 50 to generate a 300 nanosecond interval before the next master clock pulse, in the manner described above in connection with FIG. 3. In a similar way the longer delay modes employing fixed incremental increases shown in FIGS. 5 and 6 would be implemented by sending connecting line 78 (M27) high, or both connecting lines 78 (M27) and 80 (M28) high, as is appropriate. Thus, elongation of the interval between master clock pulses is controlled by a portion of the microinstruction currently in use and execution of the next microinstruction is delayed for the time needed to complete the process specified by the other portion.

A computer configured according to FIG. 7 may be assembled using commercially available LS1 components such as: a number of Four Bit microprocessor slices, type 2901, in processing unit 52; a 12-Input Odd-/Even Parity Checker/Generator, type 9348, in micromemory 58; a Microprogram Sequencer, type 2909, in microaddress generator 62; and an appropriate number of type 54LS 174, Hex D-type Edge-Triggered Flip-Flop with Clear, in microinstruction register 60. The structure of macromemory 56 is a matter of choice.

What is claimed is:

1. In a digital computer including: a central processor; a main memory; and a micro memory, said micro memory containing a number of micro instructions for specifying program steps, a master clock for controlling the timing of the digital computer comprising:
   a. an oscillator providing, as an output, a pulse train having pulses spaced at a basic fixed incremental time period;
   b. a master clock output stage having a data input and a clock input and an output providing pulses, said clock input coupled to the output of said oscillator, said output stage responsive to provide the data at its input to its output in response to the input at its clock input;
   c. timing means having said output of said oscillator as an input and providing a data input to said master clock output stage, the output of said timing means being a pulse train having pulses spread at a multiple of said basic fixed integral incremental time period which is equal to a minimum interval corresponding to the shortest time needed to perform a program step;
   d. adding means having as input signals forming part of a micro instruction and responsive thereto to add, to said minimum interval, increments equal to said basic fixed incremental time period when another part of said micro instruction calls for a program step requiring more than said minimum interval, the interval established after addition being approximately equal to the time required to perform said program step;
   e. means associated with said main memory for providing a first signal indicating that the memory is ready to be read and a second signal indicating that data from the memory is available; and
   f. means associated with said timing means having said signals as inputs and responsive to said first signal to interrupt said master clock output stage and prevent further output pulses from said master clock output stage and to said second signal to re-initiate generation of clock pulses by said master clock output stage.

* * * * *